United States Patent [19]

Bühler

[11] Patent Number: 4,566,108

[45] Date of Patent: Jan. 21, 1986

[54] BOTTOM-ELECTRODE ARRANGEMENT FOR A DIRECT-CURRENT ARC FURNACE

[75] Inventor: Karl Bühler, Nussbaumen, Switzerland

[73] Assignee: BBC Brown, Boveri & Co., Ltd., Baden, Switzerland

[21] Appl. No.: 633,924

[22] Filed: Jul. 24, 1984

[30] Foreign Application Priority Data

Jul. 28, 1983 [CH] Switzerland ............... 4132/83

[51] Int. Cl.$^4$ .............................................. H05B 7/00
[52] U.S. Cl. ..................................... 373/108; 373/72
[58] Field of Search .................... 373/108, 72, 36, 37, 373/71, 101, 38, 51, 52, 53, 54, 55, 69, 94, 95

[56] References Cited

U.S. PATENT DOCUMENTS 2,157,498  5/1939  Reinecke et al. ............... 373/94
4,032,704  6/1977  Stenkvist ........................ 373/108

Primary Examiner—Roy N. Envall, Jr.

Attorney, Agent, or Firm—Oblon, Fisher, Spivak, McClelland & Maier

[57] ABSTRACT

A direct-current electric arc furnace for melting metals, including a furnace vessel and at least a pair of electrodes, wherein a bottom electrode is mounted in the bottom of the furnace vessel. In order to be able to remove the bottom electrode, the cross-section of which tapers towards the interior of the furnace vessel, from the outside in the direction of the furnace vessel interior, the bottom electrode is provided with a molded body of a refractory material. The molded body envelopes the bottom electrode and in combination therewith forms an electrode unit. This electrode unit in turn has a cross-section which expands in the direction of the furnace vessel interior or at the most remains the same. In this way, extensive work can be saved by removing the bottom electrode from outside into the interior of the furnace. Removal of the bottom electrode is also facilitated by the fact that neither a connecting piece for applying power to the electrode and for cooling thereof nor the electric feedlines thereto need be removed.

12 Claims, 6 Drawing Figures

BOTTOM-ELECTRODE ARRANGEMENT FOR A DIRECT-CURRENT ARC FURNACE

BACKGROUND OF THE INVENTION

1. Field of the Invention

The invention relates to an electric furnace and more particularly a direct-current arc furnace having an exchangeable bottom electrode.

2. Description of the Prior Art

An electric furnace of the above-noted type is known, for example, from Swiss Patent Specification No. 452,730.

Progress in the development of semi-conductor components in recent years has given an impetus to an increasing use of direct-current arc furnaces in the iron and steel industry for smelting, predominantly for smelting electric-furnace steel.

The construction and mode of action of direct-current arc furnaces are known, for example, from the journal "Stahl und Eisen", 103 (1983) No. 3, of Feb. 14, 1983, pages 133 to 137.

For optimizing the electrical or thermal conditions, it has proven to be advantageous in a direct-current arc furnace to form the arc between one or more electrode(s) located above the melting material and the melting material itself. As the return line of the direct current, at least one electrode in the bottom of the furnace and in contact with the melt, namely the bottom electrode, is provided.

The bottom electrode is exposed to continuous, very high thermal stresses, for which materials having a high softening and melting point, for example graphite, are suitable. However, when carbon electrodes are used, the melt is carburized on the one hand. This is undesirable, however, in particular in the production of low-carbon steels. On the other hand, the carbon electrode is consumed, whereby the furnace bottom is weakened and the electric power transfer can be adversely affected.

According to the solution proposed by the above-noted Swiss Patent Specification No. 452,730, bottom electrodes are used, but have a zone also having the same chemical contents as the melt itself in contact with the metal. In this case, cooling takes place in the end zone, facing away from the furnace vessel, of the bottom electrode by convection with air, this end zone consisting of a metal having good heat-conducting and current-conducting properties, for example of copper. This is a so-called two-component bottom electrode.

The high thermal loading of the bottom electrode and the associated wear phenomena make it necessary to replace the bottom electrode from time to time, that is to say to remove the consumed electrode from the furnace hearth and to replace it by a new one.

This bottom electrode is constructed to be conically tapered in the direction of the vessel interior. This constructional shape makes it possible to install and remove the bottom electrode from outside the furnace vessel bottom.

However, this type of bottom-electrode removal is very expensive, for the following reasons:

The solidified melt residues remaining in the furnace and the metallic components encrusted in the region of the refractory material of the furnace bottom which is close to the electrode together form a mushroom-shaped coating of metal and slag. Without prior removal of this mushroom-shaped coating, however, it is impossible to remove the bottom electrode. But the removal work is labor-intensive and can be carried out only in the cooled furnace vessel which, in turn, creates a time delay for putting the furnace into operation.

In addition, for the possible ejection of the bottom electrode from the furnace bottom an ejection bolt is required which is placed centrally onto the electrode face and the force of which acts axially. But this ejection operation presupposes that the face is constructed to be level and orthogonal with respect to the axis of the bottom electrode. Due to erosion effects, however, the face, turned towards the interior of the vessel, of the bottom electrode is more or less deformed and uneven, however, and the ejection process is possible only under difficult conditions and with the risk of damaging the refractory bottom. Measures must also be taken for anchoring the ejection device in the interior of the vessel.

In addition, as disclosed in to Swiss Pat. No. 452,730, the mechanical mountings including the electric power supply cables must be released and removed before every replacement of the bottom electrode.

SUMMARY OF THE INVENTION

Accordingly, one object of this invention is to provide a novel electric furnace, the bottom electrode of which can be removed easily and with simple means from the furnace vessel bottom.

This object is achieved according to the invention by providing a novel electric arc furnace wherein in the bottom of the furnace vessel, there is provided a molded body of refractory material in conjunction with the bottom electrode, thereby forming in combination an electrode unit. The molded body has a cross-section which expands in the direction of the furnace vessel interior, or at most maintains a constant dimension so that the bottom electrode can be removed in the direction of the furnace vessel interior.

The essential characteristic of the invention is that the bottom electrode is removed, preferably ejected, in an easy and well reproducible manner from the outside into the interior of the furnace vessel. Due to the fact that the bottom electrode is enveloped by a molded part, of refractory material to form in combination an electrode unit, the possibility exists to eject the bottom electrode in a simple manner into the interior of the furnace vessel even if it is tapered in the direction of the furnace vessel interior. This saves the extensive preliminary work, usually necessary, for removing the mushroom-shaped coating in the furnace hearth which is required for the process of ejecting the bottom electrode from the interior of the vessel towards the outside. A spu-port for the ejection device, which must normally be attached in the furnace vessel, are also therefore unnecessary.

In a further development of the invention a connecting piece is provided as a contact sleeve for the bottom electrode. The connecting piece preferably consists of copper and has side walls which preferably expand in the direction of the furnace vessel bottom, the bottom electrode is supported on the side faces of the contact sleeve. The connecting piece is provided with cooling ducts, which are closed towards the electrode, for liquid cooling.

In this manner, good electric contact and an optimum cooling effect are achieved. Since the cooling of the bottom electrode takes place indirectly by the liquid-cooled connecting piece constructed as a contact sleeve, it is of significance for a good heat transfer that the conically constructed side faces of the bottom electrode and the connecting piece rest against each other with parallel faces.

According to a further development of the invention, at least one perforation is provided in the front wall of the connecting piece. This considerably facilitates installation and removal of the bottom electrode since neither the connecting piece nor the electric feed lines need be removed. A consumed bottom electrode is ejected from the furnace vessel bottom, from outside into the furnace vessel interior, in a simple manner by placing, for example, an ejection ram through the perforation in the connecting piece directly onto the front face of the bottom electrode and exerting the force required for ejection on the bottom electrode.

According to a further development according to the invention, there is provided a fastening part in the form of a metallic truncated-cone-like shielding roof, which has an opening, and vertically arranged holding cross-members. The shielding roof is open towards the bottom and is connected with the furnace vessel bottom. The upper surface of the shielding roof is provided with a covering of refractory material and the bottom electrode penetrates through the opening in the shielding roof and is supported on the contact sleeve provided by the connecting piece.

This fastening arrangement makes it possible, on the one hand, to provide secure fastening of the connecting piece and the bottom electrode under all operating conditions of the furnace, for example during charging, during melting and tilting and, on the other hand, offers safety in the case of any unforeseen furnace break-outs.

A protective roof of preferably refractory material over the location of the water cooling and below the furnace-vessel bottom prevents the liquid metal from reaching the water-cooled parts, that is to say being diverted, in the event of a furnace-bottom break-out in the vicinity of the bottom electrode. Beyond that, the protective roof serves as shielding for the feed pipes, hoses, water-cooled power lines and cables and the like.

According to a further development of the invention, both two-component bottom electrodes and those constructed of one piece can be easily removed from the furnace-vessel bottom from the outside in the direction of the furnace-vessel interior. The dimensioning selected according to a further development of the subject-matter of the invention with regard to a tapering cross-section of the bottom electrode in the direction of the furnace-vessel interior has been found to be advantageous for the ejectability of the bottom electrode from the furnace-vessel bottom, apart from having an advantageous effect on the electric and thermal characteristics of the bottom electrode.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
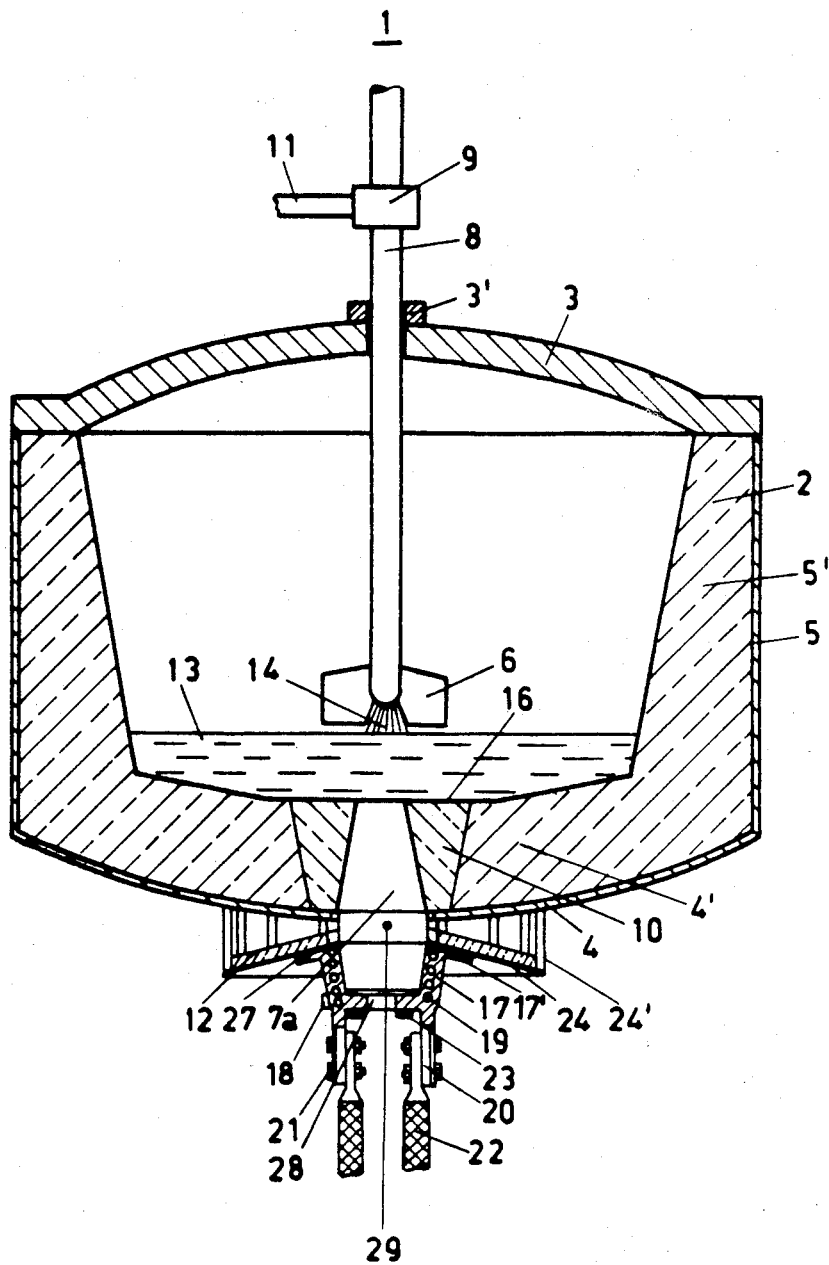
FIG. 1 is a vertical cross-sectional view through the electric furnace provided with a bottom electrode.

Referring now to the drawings, wherein like reference numerals designate identical or corresponding parts throughout the several views, FIG. 1 shows the arc furnace 1 including the furnace vessel 2 and furnace cover 3, the furnace vessel 2 consisting of the vessel bottom 4, the vessel wall 5, the refractory lining 4' of the furnace bottom 4 and the refractory linings 5' of the vessel wall 5. Above the molten bath 13, a carbon electrode 8 is arranged which projects through an opening in the furnace cover 3. For cooling the electrode 8, a cooling ring 3' is arranged. The electrode 8 is held in a holder 9 of an electrode support arm 11. The electrode support arm 11, in turn, is connected with an electrode regulating device, not shown in FIG. 1.

In the furnace vessel 5, 5', there is a furnace door 6 and an arc 14 is formed between the electrode 8 and the molten bath 13.

In the vessel bottom 4, 4', an illustrative embodiment of the bottom electrode 7a according to the invention can be seen. Electrode 7a is enclosed sleeve-like by the part 10 of refractory material. In the illustrative embodiment according to FIG. 1, the bottom electrode 7a has a conical shape which tapers in the direction of the vessel interior and which extends from the furnace vessel bottom 4 to the furnace hearth area 16. In contrast to the tapering shape of the bottom electrode 7a, the part 10 expands in the direction of the vessel interior. The bottom electrode 7a is held below the furnace vessel bottom 4 by a water-cooled connecting piece 17 which is constructed as a contact sleeve and which is used simultaneously for connecting the electric power supply. The bottom electrode 7a is fastened by means of a screw connection 23 to the front face of the connecting piece 17. The conically constructed side walls of the bottom electrode 7a rest against the inner side faces, which are also conical and expand towards the furnace bottom 3, of the contact sleeve 17 which produces a good electric connection and heat conduction between the two parts 7a and 17. At the connecting piece 17, contact lugs 20 are arranged which are constructed of one piece with the connecting piece 17 serving as a contact sleeve.

FIG. 1 shows a part of the electric power supply cable 22 which is connected by means of the screw connection 21 to the contact lugs 20 of the connecting piece 17. The connecting piece 17 is provided with cooling ducts 19 and with a cooling duct inlet branch 18. A cooling liquid, primarily water, is fed through the inlet branch 18 to the cooling ducts 19. It flows upwards through the cooling ducts 19 of the connecting piece 17, arranged in the form of a spiral, and thus cools the bottom electrode 7a in an indirect manner. The cooling liquid outlet branch of the connecting piece 17 is located at the same level as the inlet branch 18 and therefore cannot be seen in FIG. 1. The bottom electrode 7a is held by means of a fastening part which consists of a metallic truncated-cone-like shielding roof 24 and vertical holding cross-members 24'. The shielding roof 24 is arranged to be at least essentially central with reference to the furnace axis and open towards the bottom and is firmly connected to the furnace vessel bottom 4 by means of the holding cross-members 24'. The bottom electrode 7a projects through the opening of the shielding roof 24 and is supported on the connecting piece 17 which is fastened to the underside of the shielding roof 24 with insertion of an electrically insulating intermediate layer 27.

Should it be necessary to remove the bottom electrode 7a, only the screw connection 23 is loosened. A bolt, not shown in FIG. 1, of an ejection device is placed onto the front face, turned away from the interior of the vessel, of the bottom electrode 7a through the perforation 28 in the front face 28 of the connecting piece 17 and a force as required for the ejection process is applied to the bottom electrode 7a and the part 10. In this manner, the bottom electrode 7a and the part 10 enveloping it can be easily removed from the outside into the furnace-vessel interior. Since, in contrast with the front face of the bottom electrode 7a facing the melt, the face against which the ejection ram rests is accurately defined, the ejection of the bottom electrode 7a from the furnace vessel bottom 4, 4' can be repeated in every case with good reproducibility.

Figure 2:
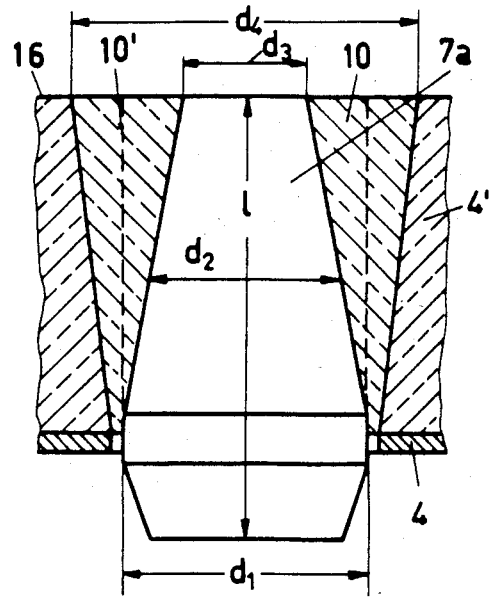
FIG. 2 is an enlarged vertical cross-sectional view through the bottom electrode according to the invention in the first illustrative embodiment according to FIG. 1.

FIG. 2 shows a vertical cross-sectional view through the bottom electrode according to the invention in a first illustrative embodiment as shown in FIG. 1, but in an enlarged illustration. The bottom electrode 7a, having the diameter $d_1$ in the region of the furnace-vessel bottom 3, tapers conically towards the hearth area 16 where it has a diameter of $d_3$. The part 10, enveloping the bottom electrode 7a, in contrast, which also has approximately a diameter of $d_1$ in the region of the furnace bottom 3, expands and has the diameter $d_4$ in the hearth area. The dot-dash line 10' indicates that the part 10 could also be constructed to be cylindrical without thus making the ejection process of the bottom electrode 7a from the furnace bottom 5 much more difficult. The mean diameter of the bottom electrode 7a is designated by $d_2$ and the total length of the bottom electrode 7a by l.

Figure 3:
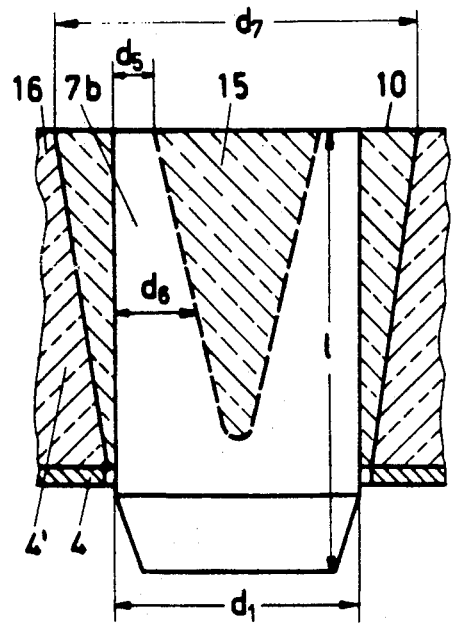
FIG. 3 is a vertical cross-sectional view through the bottom electrode according to the invention in a further illustrative embodiment.

FIG. 3 is a vertical cross-sectional view through another bottom electrode 7b according to the invention. The bottom electrode 7b has a cylindrical shape and is also enveloped by the part 10, which again expands in the direction of the vessel interior. In this manner, the ejection of the bottom electrode 7b from the furnace vessel bottom is again considerably facilitated. As can be seen by the dashed line, the bottom electrode 7b has a moulded body 15 of a refractory material which is arranged in a funnel-shaped recess inside the bottom electrode 7b. The recess extends in an axial direction from the end face, facing the vessel interior, of the bottom electrode 7b to the region of the furnace-bottom 4. The molded body 15 is used for the purpose of reducing the cross-section of the bottom electrode 7b in the direction of the furnace-vessel interior which reduces its power loss. In the furnace-vessel bottom 4, the electrode 7b has a diameter of $d_1$ which is reduced by the molded body 15 in the furnace hearth area 16 to the radial width $d_5$ of the ring. The electrode 7b and part the molded part 10 jointly have a diameter $d_7$ in the furnace hearth area 16. The mean diameter is designated by $d_6$ and the length again by l.

Figure 4:
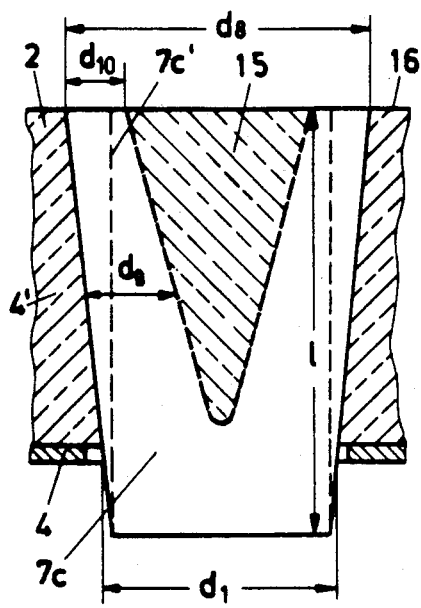
FIG. 4 is a vertical cross-sectional view through the bottom electrode according to the invention in a further illustrative embodiment.

FIG. 4 shows the bottom electrode 7c, the outside diameter of which expands in the direction of the vessel interior or at the most remains the same as indicated by the dashed lines 7c'. The bottom electrode 7c does not have a part completing it because the ejection towards the vessel interior is ensured even without such a part. However, the bottom electrode 7c is provided with a funnel-shaped moulded body 15 which, as already explained in the description of FIG. 3, is used for limiting the power loss. The bottom electrode 7c has a diameter $d_1$ in the furnace vessel bottom 4, an outer diameter $d_8$ in the furnace hearth area 16 but a metallically effective ring width of only $d_{10}$ in the furnace hearth area 16. The mean diameter is designated by $d_9$ and the length again by l.

Figure 5:
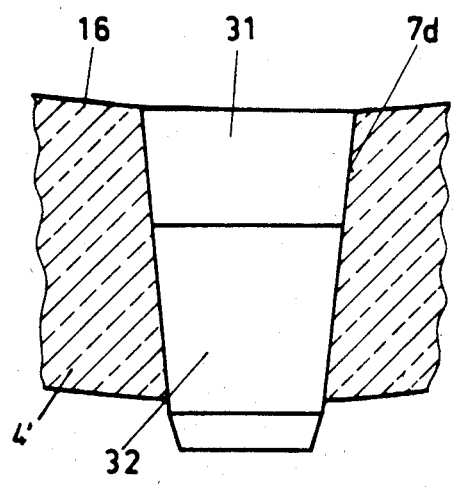
FIG. 5 shows a vertical section through the two-component bottom electrode according to the invention.

In FIG. 5, a two-component bottom electrode 7d is shown which consists of an iron alloy part 31 facing the furnace hearth area 16, and a copper part 32. The two parts 31, 32 are metallurgically joined to each other which ensures that the electrode 7b can be ejected without problems from the outside in the direction of the vessel interior.

Figure 6:
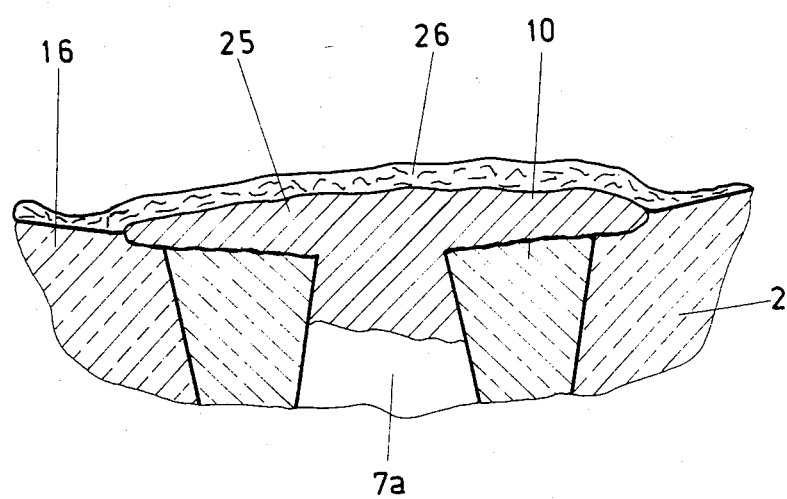
FIG. 6 is a partial vertical cross-sectional view through the furnace-vessel bottom provided with the bottom electrode according to the invention as in FIG. 1.

FIG. 6 shows a partial vertical cross-sectional view through the furnace vessel bottom 4' and the bottom electrode 7a in an enlarged representation.

In FIG. 6, the mushroom-shaped metal zones 25 and slag zones 26 can be seen which penetrate into the refractory lining of the furnace vessel bottom 4', into the bottom electrode 7a and into the molded part 10 and which can be removed only with difficulty. Removal of the layers 25, 26, however, would be an absolute prerequisite for ejecting the bottom electrode 7a from the interior of the vessel towards the outside.

The bottom electrode 7a, b, c, d according to the invention, however, makes it possible to accomplish a removal from the furnace vessel bottom 4' easily and without prior extensive cleaning work.

Naturally, the bottom electrode 7a, b, c, d can have either a round or a polygonal cross sectional shape.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A direct-current electric arc furnace for melting metals, comprising:
   a furnace vessel including a bottom wall having interior and exterior surfaces;
   at least a pair of electrodes, including a bottom electrode; and
   a molded part formed of refractory material enveloping said bottom electrode to provide in combination therewith an electrode unit which is mounted in the bottom wall, said electrode unit having a cross-sectional shape tapered from said interior surface to said exterior surface such that said bottom electrode is removable in a direction toward the interior of the furnace vessel.

2. A furnace according to claim 1, further comprising:

a connecting piece mounted exterior of said vessel bottom wall for holding at least a portion of an end part of the bottom electrode below the vessel bottom wall, said connecting piece having an interior cavity extending in the direction of the vessel bottom to define contact surfaces substantially enveloping and fittingly detachably contacting said portion of said end part of said bottom electrode.

3. A furnace according to claim 2, wherein said connecting piece comprises:
   cooling ducts, which are not in communication with the bottom electrode, for liquid cooling of said connecting piece and indirect cooling of said bottom electrode.

4. A furnace according to claim 3, comprising:
   at least one perforation provided in an end face of the connecting piece.

5. A furnace according to claim 2, comprising:
   means for fastening said bottom electrode to the bottom of the furnace vessel, comprising
   a shielding roof provided between the furnace vessel bottom and the connecting piece to protect the connecting piece against any liquid metal which may penetrate the furnace vessel bottom, said shielding roof formed of a metal and having a truncated cone-like shape extending from a first opening closest to said vessel bottom to a larger second opening further away from said vessel bottom, said shielding roof joined to the furnace vessel bottom by means of vertically arranged cross-members and having an upper surface provided with a covering of refractory material; and
   said bottom electrode projecting through said first opening of the shielding roof and supported on said connecting piece.

6. A furnace according to claim 1, wherein the bottom electrode is constructed of one piece and comprises an iron alloy consisting of 99.9% Fe.

7. An electric furnace according to claim 1, wherein the bottom electrode comprises at least two parts formed of respective materials, including a first part facing the furnace vessel interior and consisting of an alloy which has chemical contents which are similar to that of the molten bath and a second part consisting of copper, said first part having a length of $\frac{1}{8}$ to $\frac{1}{2}$ of the total length of the bottom electrode.

8. A furnace according to claim 1, wherein:
   said molded part comprises an outer surface tapered from said interior surface of said bottom wall to said exterior surface of said bottom wall and an inner surface tapered from said exterior surface of said bottom wall to said interior surface of said bottom wall; and
   said bottom electrode comprises an outer surface tapered from said exterior surface of said bottom wall to said interior surface of said bottom wall and fittingly engaging said inner surface of said molded part.

9. A furnace according to claim 1, wherein:
   said bottom electrode includes an inner surface tapered from said interior surface of said bottom wall towards said exterior surface of said bottom wall; and
   said molded part comprises at least a first molded part fittingly engaging said inner surface of said bottom electrode.

10. A furnace according to claim 9, wherein:
    said bottom electrode includes an exterior surface; and
    said molded part includes a second molded part having an outer surface tapered from said interior surface of said bottom wall to said exterior surface of said bottom wall and an inner surface fittingly engaging the outer surface of said bottom electrode.

11. A furnace according to claim 9, wherein said bottom electrode includes an outer surface tapered from said interior surface of said bottom wall to said exterior surface of said bottom wall.

12. A furnace according to claim 1, comprising:
    said electrode unit having a flat surface orthogonal to a center axis of said electrode unit provided at an end of said electrode unit closest to said exterior surface and adapted to engage an ejection ram.

* * * * *